H. H. STYLL.
EYEGLASSES.
APPLICATION FILED FEB. 5, 1912.
1,039,462.
Patented Sept. 24, 1912.
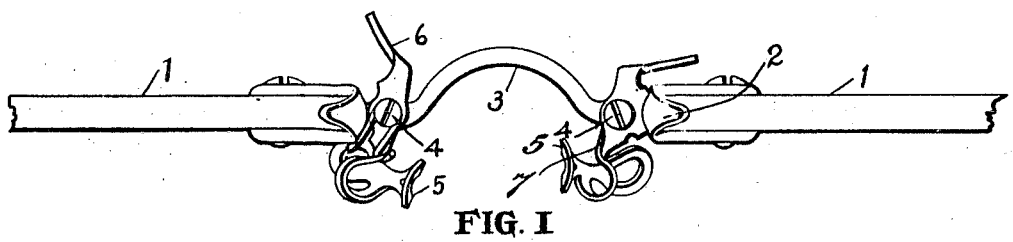
FIG. I
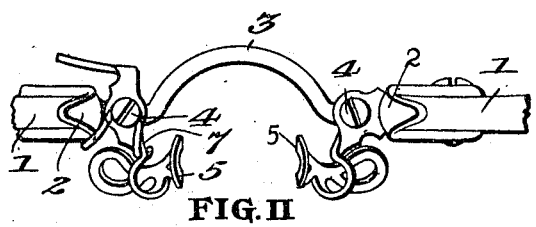
FIG. II
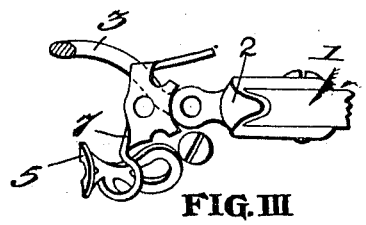
FIG. III
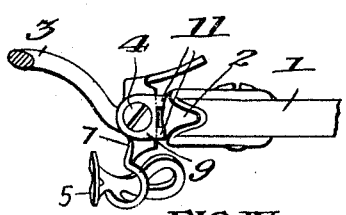
FIG. IV
FIG. V
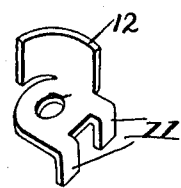
FIG. VI
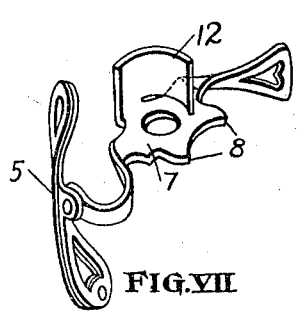
FIG. VII
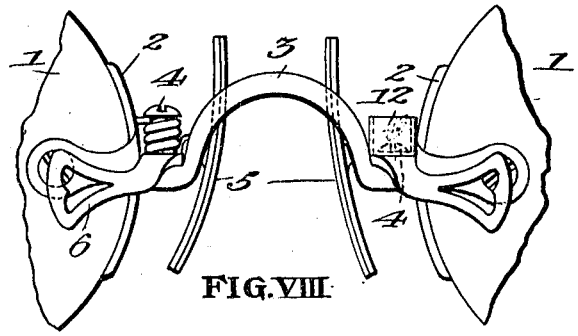
FIG. VIII
WITNESSES:
Joseph J. Demers
Reginald H. Waters
INVENTOR
HARRY H. STYLL
BY
H. H. Styll
ATTORNEYS

UNITED STATES PATENT OFFICE.

HARRY H. STYLL, OF SOUTHBRIDGE, MASSACHUSETTS, ASSIGNOR TO AMERICAN OPTICAL COMPANY, OF SOUTHBRIDGE, MASSACHUSETTS, A CORPORATION OF MASSACHUSETTS.

EYEGLASSES.

1,039,462.  Specification of Letters Patent.   Patented Sept. 24, 1912.

Application filed February 5, 1912. Serial No. 675,512.

*To all whom it may concern:*

Be it known that I, HARRY H. STYLL, a citizen of the United States, residing at Southbridge, in the county of Worcester and State of Massachusetts, have invented certain new and useful Improvements in Eyeglasses, of which the following is a specification.

My invention relates to improvements in eyeglasses, and has for its leading object the provision of an improved mounting of this character which may be readily placed upon or removed from the face and which may be more readily placed and secured in exactly correct position upon the face than is possible with the ordinary finger piece mountings now in use.

The further object of my invention is the provision of an improved mounting which shall include a part that may be adjusted to at all times remain in a fixed position relative to the lenses and which will bear upon the nose and serve as a guide for the exact correct positioning of the glasses which shall further be provided with a second portion adapted to clampingly engage the nose to hold the same in the desired position.

Other objects and advantages of my improved eyeglass mounting will be readily apparent by reference to the following description taken in connection with the accompanying drawings, and it will be understood that I may make any modifications in the specific details of construction shown and described which fall within the scope of the appended claims and embody my generic idea of one fixed nose engaging portion and a finger controlled clamp for holding the mounting in position without in anywise departing from or exceeding the spirit of my invention.

Figure I represents a plan view of a pair of eyeglasses constructed in accordance with the principles of my invention, the clamp being shown in disengaging position. Fig. II represents a plan view of my mounting with the parts in normal position, the fixed lever being shown without a handle. Fig. III represents a plan view of one method by which the lever at one side of the mounting may be held in inoperative position. Fig. IV represents a view of an ordinary finger piece mounting with one of the levers locked in dead position. Fig. V represents a perspective view of the locking means. Fig. VI represents a perspective view of a slightly modified form of locking means. Fig. VII represents a finger piece lever embodying both means for holding the same stationary and for concealing the absence of the actuating spring therefor, and Fig. VIII represents a front view of a mounting embodying said lever.

In the drawings, the numeral 1 designates the lenses which are connected by the usual supports including the lens clips 2 and the bridge 3 having the pivot seats 4 for receiving the pivot screws. Ordinarily in finger piece mountings there are a pair of pivoted levers both of which are adjusted by pressure of the fingers to swing the guards outward and which each depend upon equal pressure for forcing the two levers back evenly so that the lenses 1 may be at all times in the same position relative to the two guards 5. Weakening of one of the actuating springs, however, or a difference in the way that the glasses are put on is liable to throw the lenses slightly off their correct center, and this is a serious matter in the case of some prescription lenses. My invention obviates these objections by providing one guard which fixedly engages the nose and which is always in a certain predetermined position, while the other guard is movable and forms a clamp which may be released by engagement of the outer end or handle 6 to facilitate removing or placing in position the glasses, which clamp will hold the glasses in position in the same way that ordinary finger piece glasses operate.

In this application I have illustrated but one of the many means for providing a dead lever, the means illustrated consisting in forming on the outer side of the lever 7 the pair of tongues 8 for spanning the clip 2 to hold the lever, but it will be understood that the lever may be soldered to the lens supports, may be formed integral therewith, may be riveted thereto, held in place by the lens screw, bent around the mounting, split to have one portion held by the mounting and another portion resting against the mounting, or otherwise secured against movement. In the event that persons now having finger piece eyeglasses desire to employ my improvement and at the same time use their old mountings and guards, I may employ means for locking one of the levers against pivotal movement and in certain of the figures of the drawings I have illustrated a means for this purpose which comprises a washer member 9 having an aperture 10 to receive the ordinary pivot post or screw and having the downwardly bent spaced lugs or tongues 11 for spanning the bridge and extending between the lens clip and the lever to lock the lever against pivotal movement in either direction. In another form this washer has the wing 12 which may be bent upward in front of the pivot post to conceal the absence of the usual actuating spring in which event a very short pivot post may be employed. It will be understood that this is but one of the many ways in which an ordinary finger piece lever may be locked against movement. In Fig. VII of the drawings I have likewise shown the lever 7 as provided with a wing 12 for concealing the short pivot screw as is most clearly shown in Fig. VIII.

From the foregoing description taken in connection with the accompanying drawings the construction and operation of my improved finger piece mounting will be readily apparent, and it will be seen that I have provided eyeglass structure in which the position of the stationary guard 5 may be satisfactorily adjusted to the exact contour of the nose and to the exact position relative to the lenses and then the other guard adjusted to correctly engage the nose to hold the mounting in place, the fixed guard thus always regulating the position of the mounting and being first placed in correct position against the nose when the clamp arm may be released to allow the same to clamp the glasses in place.

I claim:

1. The combination with a lens mount having a seat provided with a tapped aperture, of a lever resting upon the seat, a screw passing through the lever and engaged in the tapped aperture for securing the lever upon the seat, and tongues for locking the lever against pivotal movement relative to the lens mounting.

2. The combination with a lens mounting having a seat, of a lever mounted upon the seat and provided with a pair of tongues engaging a portion of the mounting to prevent relative rotation of the mounting and lever, and means for detachably securing the lever to the seat.

3. The combination with a bridge, said bridge having a bearing portion at one end thereof, of a lever rotatably supported on the bearing, and tongues for locking the lever against rotation.

4. The combination with a lens clip, of a bridge secured thereto, said bridge having a portion thereof adjacent the lens clip formed to provide a seat, means for securing the lever in position, and tongues formed integral with the lever and curving partially around the clip to prevent relative movement of the lever and clip.

In testimony whereof I affix my signature in presence of two witnesses.

HARRY H. STYLL.

Witnesses:
H. K. PARSONS,
JOSEPH J. DEMERS.

Copies of this patent may be obtained for five cents each, by addressing the "Commissioner of Patents, Washington, D. C."